DEVICE FOR USE IN MAGNETIC TAPE CONVEYING EQUIPMENT

Filed March 5, 1963 2 Sheets-Sheet 1

INVENTORS
WALTER FISCHER
DIETER SCHAFER

BY Percy P. Lantzy

ATTORNEY

DEVICE FOR USE IN MAGNETIC TAPE CONVEYING EQUIPMENT

Filed March 5, 1963 2 Sheets-Sheet 2

INVENTORS
WALTER FISCHER
DIETER SCHAFER
BY Percy P. Lantzy
ATTORNEY 3,207,402
Patented Sept. 21, 1965

1

3,207,402
DEVICE FOR USE IN MAGNETIC TAPE CONVEYING EQUIPMENT

Walter Fischer, Stuttgart-Stammheim, and Dieter Schafer, Leonberg-Eltingen, Germany, assignors to International Standard Electric Corporation, New York, N.Y., a corporation of Delaware Filed Mar. 5, 1963, Ser. No. 262,958
Claims priority, application Germany, Mar. 15, 1962, St 18,972
6 Claims. (Cl. 226—195)

The invention relates to a device for use in magnetic tape conveying systems, such as are required for high capacity, rapid access, tape storage units in electronic computers.

In some tape conveying systems the magnetic tape is moved past the reading and writing heads with a high speed of several meters per second. Due to high information density and short access time requirements, it is necessary that the tape be accelerated very quickly from standstill to operation velocity and vice versa. This is only possible if less than the entire quantity of tape on the tape reels is accelerated. Therefore, buffer tape handling devices are usually provided, on the left and right sides of the heads, for loosely storing a certain quantity of tape sufficient to bridge the time between commencement of motion at the heads and the start or stop of the tape reels. This certain quantity of tape may, for example, be stored loosely in intermediate containers.

In order to move the tape from the main tape reels to the intermediate container and vice versa, a conveying device is required which functions to draw the tape from the reel as it is conveyed into the container and to tauten the tape as it is conveyed from the container to the reel during rewinding, so that the tape is tightly wound on the rewind reel.

Subject of the invention is such a conveying device. A known design of a conveying device uses a conveying roller which is pressed against the tape by a pressing roller. By varying the pressure of the pressing roller and by means of a turn-over roller which changes the incident angle at the driving roller, the conveying force, is adjustable over a wide range.

In another known design a slip clutch is provided for dispensing the tape from the reel, and a braking device in conjunction with a second slip clutch is provided to wind the tape on the reel. In this design when changing from one to the other direction of tape motion, the conveying device must be switched over simultaneously. This means that besides the mechanical parts additional electrical control means are required.

Hence the main object of the invention is to provide an automatically self-regulating tape tensioning device which functions effectively without the intervention of sensing devices and/or electrical switches, to maintain constant tension on the tape independently of the direction of motion of the tape.

The design according to the invention satisfies this objective. It is based upon the observation that the direction of the tension force exerted by the conveying device on the tape, must be the same for either direction of tape movement, and can be essentially constant. With a regulated constant tension force directed from the reel towards the conveying device, the tape may be led from the reel to the actual conveying roller via a turn-over roller and from there to the container, or the tape may be rewound from the container onto the reel, with the required constant tension maintained automatically, so that additional electrical controls are not required in connection with reversals in the direction of tape movement.

A device according to the invention, for conveying tape from tape reels to intermediate containers and vice versa, while maintaining a constant tension on the tape, is characterized by a self-regulating eddy-current clutch including a constantly rotating driving element, rotating at constant angular velocity in one direction only, and a driven element which is coupled to the conveying roller, said clutch maintaining a constant tension force on the tape independently of the direction of movement of the tape.

2

According to a specific embodiment of the invention, regulation and/or constancy of the tension force on the tape is achieved by changing the size of a gap between the driving and driven parts of the eddy-current clutch, this being accomplished by means of a variable axial linkage, between the driven clutch element and the conveying roller, for imparting axial movement to the driven element relative to the driving element of the clutch and thus for varying the coupling between the driven element and a magnet secured to the driving element.

The invention will now be described with reference to the accompanying drawings, in which.

Figures 1, 5:
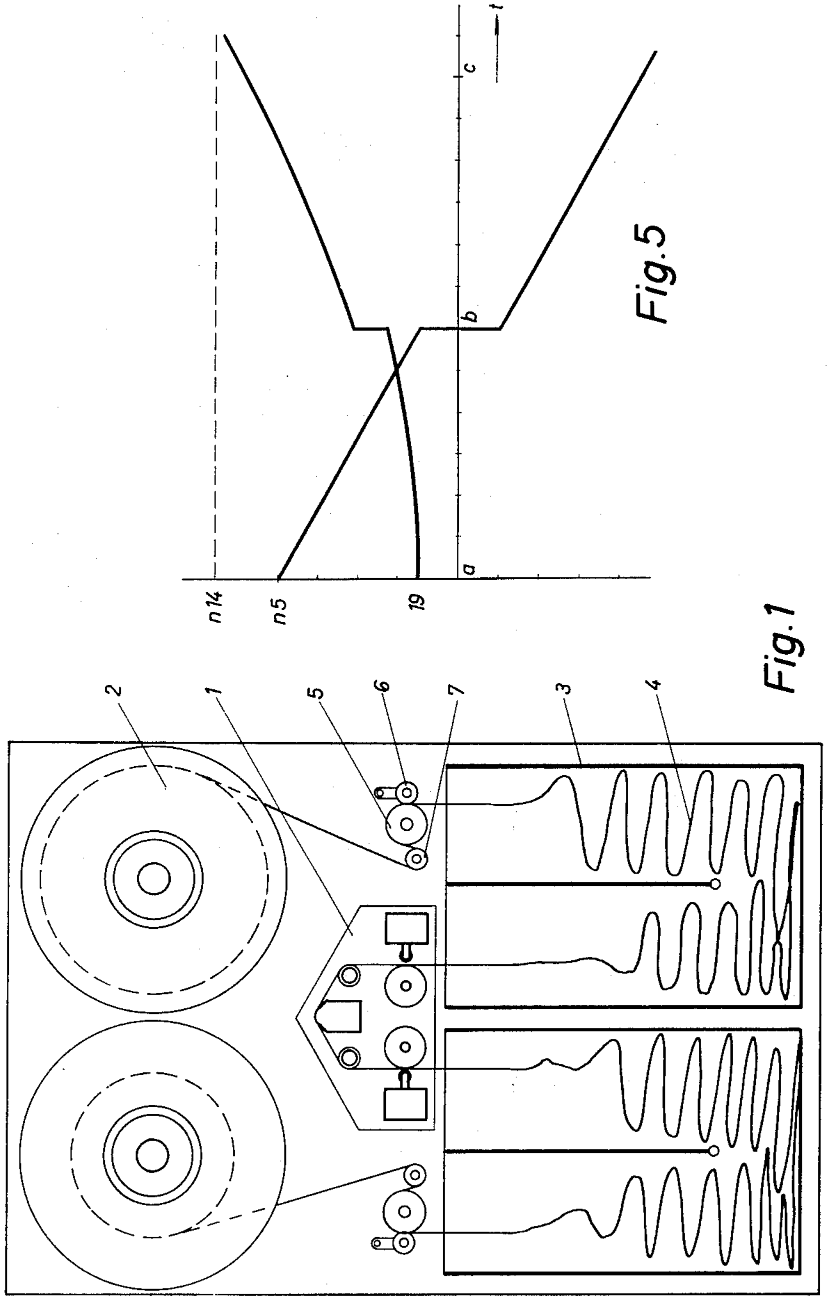
FIGURE 1 shows a magnetic tape conveying system and the disposition of the tape therein in a schematical representation.
FIGURE 5 is a chart illustrating certain operating characteristics of the device shown in FIGURE 2.

FIGURE 1 shows all those parts of a tape conveying system for use in digital data processing which are necessary to explain the present invention. The tape is passed in conventional fashion from a tape reel 2 around a turn-over roller 7 to the actual conveyor roller 5 against which the tape is pressed by a pressing roller 6. The tape next passes into a first intermediate container 3 which loosely stores a certain quantity of tape 4. From this intermediate container the tape is passed across the plate 1 on which the reading and writing heads are mounted. The tape is guided from there to the second tape reel correspondingly.

Figure 2:
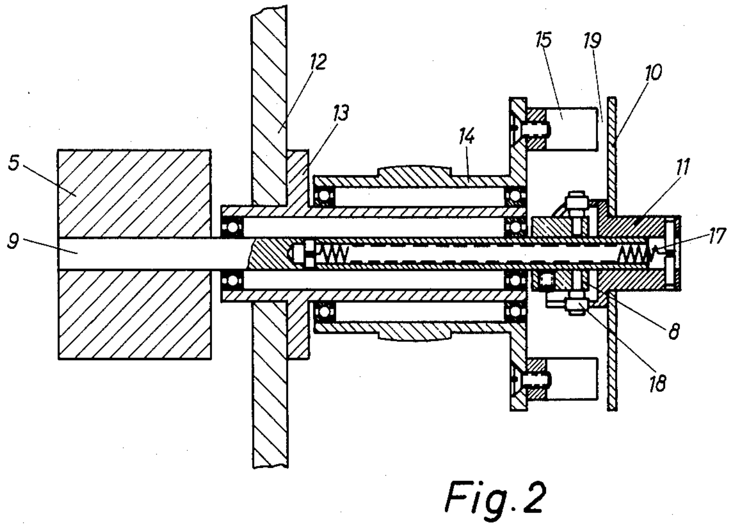
FIGURE 2 is a view in longitudinal section of a device according to the invention.

FIGURE 2 shows the conveying device according to the invention which is connected with the conveying roller 5 and which is arranged on the rear side of the front panel 12 on which all of the parts of the conveying system are mounted. A flange 13 is firmly secured to the panel 12, and a hub 14 rotatably mounted on flange 13 via ball bearings, is provided with a disc extension having magnets 15 secured thereto. The hub 14 is unidirectionally driven at a constant r.p.m. rate, by a constant r.p.m. motor and belt (not shown), independently of the influences to be described below. This hub may be referenced as the main driving element of the tape-conveying device of this invention.

Inside the flange 13 and also rotatably seated on ball bearings, a driven shaft 9 is provided, the shaft 9 being rigidly connected with the conveying roller 5. The surface of the conveying roller, or the entire roller, may be made of rubber or similar material in order to ensure secure transport of the tape through the roller. The tape is thus driven by the conveying roller during reel-off without slack and thus without lashing, or it passes through the roller during windup of the tape.

Between the drive and driven elements, represented, respectively, by hub 14, and shaft 9, there is provided a self-regulating slip-type clutch arrangement. This clutch essentially consists of two parts; namely of the actual coupling elements and of a controlling device.

Figure 4:
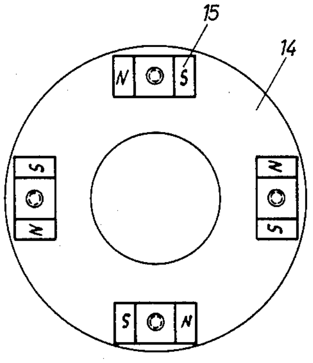
FIGURE 4 illustrates an example of the positioning of permanent magnets on the disc of the hub shown in FIGURE 2.

The driving half of the clutch coupling elements comprises the disc of the hub 14 which bears symmetrically to its axis of rotation at least two permanent magnets 15 so disposed that the associated magnetic flux describes a circle concentric with the axis of rotation (see FIGURE 4). It is also possible to arrange the magnets so that the magnetic field extends radially.

In the reposing position of the conveying device, the driven clutch coupling element, comprising eddy-current disc 10, is situated at a predetermined axial position which determines a corresponding gap 19 relative to the magnets 15. Thus if this axial position were fixed, an increased or decreased torque would be coupled magnetically to disc 10 and thus to shaft 9, in correspondence with a respectively increasing or decreasing angular velocity difference between the two clutch discs. In order to transfer a constant torque to disc 10, independently of the r.p.m. difference, a regulating device is provided.

Figure 3:
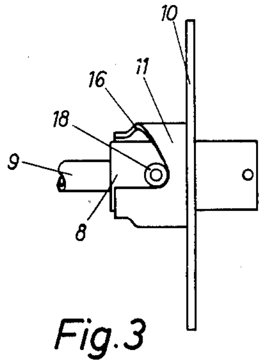
FIGURE 3 shows details of an arrangement useful in the device of FIGURE 2, to vary the coupling between driving and driven clutch elements therein.

As may be gathered from FIGURES 2 and 3, the regulating device serves to vary the gap 19 between the disc 10 and magnets 15 of the clutch. Aside from the r.p.m. difference, a factor influencing the magnitude of the transferred torque is the size of the gap 19. If at an increasing r.p.m. difference, associated with an increasing torque, there was a tendency for gap 19 to increase, then an automatic regulation could be achieved. To this end a dogging ring 8, firmly secured to the shaft 9, is provided with two rollers 18 and the clutch disc 10 is provided with a hub extension 11 biased towards shaft 9 by spring 17, and having curved cam surfaces 16 which interact with the rollers 18. If hub 14 and disc 10 were both at rest, curves 16 would contact the respective rollers 18 at the lowest points thereof as shown in FIGURE 3. If the system is in motion and if the transferred torque tends to vary from a nominal level associated with a certain r.p.m. difference between hub 14 and disc 10, the rollers are displaced from reference intermediate positions thereof along the curves 16, and the clutch disc 10 thus translates axially to vary the gap 19 between the clutch discs in proportion to the r.p.m. difference. Thus for an increased r.p.m. difference, gap 19 is increased and the transferred torque tends to remain constant. The smallest gap 19, that associated with the reposing position of the discs, is made as small as possible without actual contact between the discs, in order to obtain the required tape tension even at the minimum contemplated r.p.m. difference.

The mode of operation of the self-regulating eddy-current clutch can easily be explained with reference to FIGURE 5. The abscissa of the chart in FIGURE 5 represents time, and the three curves therein demonstrate the variations in gap size with corresponding variations in the relative angular velocities of the clutch disc elements. At time position *a* the reeling-off of the tape begins, starting with a full reel; at time *b* the reel concerned is completely empty, and rewinding commences; and the rewinding is completed at time *c*. To simplify the diagram it is assumed that the changeover from reeling-off to rewinding is made immediately after the tape has reeled off. On the ordinate reference line in FIGURE 5, the initial rotations per minute of the hub 14, and the conveying roller 5, are respectively indicated at $n_{14}$ and $n_5$, and the initial size of gap 19 is also shown. As already mentioned above $n_{14}$ is constant. At the commencement of reeling-off, the tape velocity and, consequently, the r.p.m. $n_5$ of roller 5 is high. The predetermined magnitude of the maximum torque coupling is thus determined by the minimum r.p.m. difference shown at time position *a*, $(n_{14}-n_5)_a$. The linear tape velocity decreases as the diameter of the tape reel is reduced, because the reels are driven at a constant r.p.m. Hence the corresponding r.p.m. difference and gap 19 increase proportionately. If the reeling-off is completed, i.e. at point *b*, then $n_5=0$ and gap 19 passes through a reference nominal condition. During winding-up, roller 5 is driven by the tape. Thus the r.p.m. difference becomes $n_{14}-(-n_5)=n_{14}+n_5$ and increases further reaching a peak value at *c*. This peak value determines the maximum regulation condition, i.e. the maximum conditions for which the curve segments and the spring must be designed. As may be gathered from the curve relating to gap 19 the gap continues to widen towards a corresponding peak magnitude.

There is a loss in energy in the regulator, manifested in the form of heat produced in the eddy-current disc 10. This heat, however, can easily be dissipated by the air current caused by the magnets 15, which operate like fan arms.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. In apparatus for rapidly conveying magnetic tape in either direction between a reel and an intermediate loose storage container, a device positioned at a given point intermediate said reel and said container for applying a uniform tension to said tape directed towards said container, irrespective of the direction of movement of said tape, comprising: drive means including a hub travelling at a constant angular velocity irrespective of the direction of movement of said tape; driven means—including a conveying roller situated intermediate said reel and said container, in intimate rolling contact with said tape, and a torque coupling element rotatably linked with said roller but axially displaceable in relation thereto; means magnetically coupling said torque element to said hub for imparting a rotational torque through said coupling element to said conveying roller, resulting in a tension force on said tape, said force directed from said roller towards said container; and regulating means between said roller and said torque element, sensitive to the difference in angular velocity between said hub and said conveying roller, for varying the axial position of said torque coupling element so as to maintain said tension force substantially constant.

2. In apparatus for rapidly conveying magnetic tape in either direction between a reel and an intermediate loose storage container, a device positioned at a given point intermediate said reel and said container for applying a uniform tension to said tape directed towards said container, irrespective of the direction of movement of said tape, comprising: drive means including a hub traveling at a constant angular velocity; driven means including a conveying roller situated intermediate said reel and said container, in intimate rolling contact with said tape, and a torque coupling element rotatably linked with said roller but axially displaceable in relation thereto; means magnetically coupling said torque element to said hub for imparting rotational torque through said coupling element to said conveying roller, resulting in a tension force on said tape, said force directed from said roller towards said container; and regulating means sensitive to the difference in angular velocity between said hub and said conveying roller for varying the axial position of said torque-coupling element so as to maintain said tension force substantially constant, said regulating means comprising means resiliently biasing said torque-coupling element in a first axial direction relative to said conveying roller and said hub, a member secured to said torque-coupling element having a predetermined cam surface, and a cam-follower-roller mounted in a fixed rotational relation to said conveying roller and extending into rolling engagement with said cam surface.

3. In apparatus for rapidly conveying magnetic tape in either direction between a reel and an intermediate loose storage container, a device positioned at a given point intermediate said reel and said container for applying a uniform tension to said tape directed towards said container, irrespective of the direction of movement of said tape, comprising: drive means including a hub travelling at a constant angular velocity; driven means including a conveying roller situated intermediate said reel and said container, in intimate rolling contact with said tape, and a torque-coupling element rotatably linked with said roller but axially displaceable in relation thereto; means magnetically coupling said torque element to said hub for imparting a rotational torque through said coupling element to said conveying roller, resulting in a tension force on said tape, said force directed from said roller towards said container; and regulating means sensitive to the difference in angular velocity between said hub and said conveying roller, for varying the axial position of said torque-coupling element so as to maintain said tension force substantially constant, said regulating means including means resiliently biasing said torque-coupling element in a first axial direction relative to said conveying roller and said hub; a member secured to said torque-coupling element having a predetermined cam surface; and a cam follower roller mounted in fixed rotational relation to said conveying roller and extending into rolling engagement with said cam surface.

4. In apparatus for rapidly conveying magnetic tape in either direction between a reel and an intermediate loose storage container, a device positioned at a given point intermediate said reel and said container for applying a uniform tension to said tape directed towards said container, irrespective of the direction of movement of said tape, comprising: drive means including a hub travelling at a constant angular velocity; driven means including a conveying roller situated intermediate said reel and said container, in intimate rolling contact with said tape, and a torque-coupling element rotatably linked with said roller but axially displaceable in relation thereto; means magnetically coupling said torque element to said hub for imparting rotational torque through said coupling element to said conveying roller, resulting in a tension force on said tape, said force directed from said roller towards said container; and regulating means sensitive to the difference in angular velocity between said hub and said conveying roller for varying the axial position of said torque-coupling element so as to maintain said tension force substantially constant, said regulating means comprising first and second members mounted in screw and nut relationship relative to each other, which members are respectively connected to said conveying roller and said torque-coupling element, and means resiliently biasing one of said members towards the other of said members.

5. In apparatus for rapidly conveying magnetic tape in either direction between a reel and an intermediate loose storage container, a device positioned at a given point intermediate said reel and said container for applying a uniform tension to said tape directed towards said container, irrespective of the direction of movement of said tape, comprising: drive means including a hub traveling at a constant angular velocity; driven means including a conveying roller situated intermediate said reel and said container, in intimate contact with said tape, and a torque-coupling element comprising an eddy current disc rotatably linked with said roller but axially displaceable in relation thereto; means magnetically coupling said torque element to said hub for imparting a rotational torque through said coupling element to said conveying roller resulting in a tension force on said tape, said force directed from said roller towards said container; said driving means including a disc extension secured to said hub with at least one permanent magnet extending therefrom towards said eddy-current disc for manifesting said magnetic coupling; and regulating means sensitive to the difference in angular velocity between said hub and said conveying roller for varying the axial position of said torque-coupling element and therefore the gap spacing between said eddy-current disc and said magnet in direct proportion to the difference in angular velocities of said hub and said conveying roller, so as to maintain said tension force substantially constant.

6. A device, according to claim 2 including a plurality of magnets disposed to provide a circular magnetic field pattern concentric with the axis of rotation of the said eddy-current disc.

References Cited by the Examiner

UNITED STATES PATENTS

| | | | |
|---|---|---|---|
| 1,892,554 | 12/32 | Kellogg. | |
| 2,087,366 | 7/37 | Whitman | 226—195 |
| 2,365,691 | 12/44 | Fodor | 242—75.11 |
| 2,978,195 | 4/61 | Weber et al. | 242—45 |

ROBERT B. REEVES, *Primary Examiner.*

RAPHAEL M. LUPO, SAMUEL F. COLEMAN, *Examiners.*